United States Patent

[11] 3,561,747

| [72] | Inventor | Alfred F. Donnelly<br>Thousand Oaks, Calif. |
|---|---|---|
| [21] | Appl. No | 762,512 |
| [22] | Filed | Sept. 25, 1968 |
| [45] | Patented | Feb. 9, 1971 |
| [73] | Assignee | Pneumo Dynamics Corporation<br>Cleveland, Ohio<br>a corporation of Delaware |

[54] BELLEVILLE SPRING SUPPORTS
9 Claims, 2 Drawing Figs.

[52] U.S. Cl. .................................................... 267/161
[51] Int. Cl. .................................................... F16f 1/26
[50] Field of Search .......................................... 267/161,
162, 163, 49, 56; 308/6

[56] References Cited
UNITED STATES PATENTS

| 2,614,832 | 10/1952 | Godfrey | 267/49 |
| 3,375,000 | 3/1968 | Seamands et al. | 267/1(62) |

*Primary Examiner*—James B. Marbert
*Attorney*—Stephen M. Mihaly

ABSTRACT: Belleville spring supports in the form of closely packed antifriction bearings contained in races having sufficient radial clearance to permit radial movement of the bearings with the I.D. and O.D. edges of the Belleville spring supported thereby as they move in and out during deflection.

INVENTOR
ALFRED F. DONNELLY

BY
ATTORNEY

BELLEVILLE SPRING SUPPORTS

BACKGROUND OF THE INVENTION

The present invention relates to certain improvements in Belleville springs supports primarily designed to reduce friction and wear at the bearing surfaces.

Belleville springs offer certain important advantages over conventional helical springs such as smaller size for a given spring force and special deflection-rate characteristics, but their use has been limited because of the substantial friction that is developed by the relative sliding movement of the I.D. and O.D. edges of the Belleville springs against the usual fixed mounting surfaces during flexing. Various attempts have been made to eliminate such friction as by providing flexible mounting supports for the Belleville springs, but the results have not been entirely satisfactory since often times such flexible mounting supports have an undesirable effect on the spring rate characteristics, and moreover they are quite costly.

SUMMARY OF THE INVENTION

With the foregoing in mind, it is a principal object of this invention to provide improved Belleville spring supports of relatively simple and inexpensive construction.

A further object is to provide such Belleville spring supports for effectively eliminating undesirable friction and wear of the Belleville spring bearing surfaces during flexing, and without changing the spring rate characteristics of the spring.

These and other objects of the present invention may be achieved by supporting both the I.D. and O.D. edges of the Belleville spring by closely packed antifriction bearings. The antifriction bearings are contained in races having sufficient radial clearance for the bearings to permit radial movement with the edges of the spring as they move in and out during deflection.

DESCRIPTION OF THE PREFERRED EMBODIMENT

Figure 1:
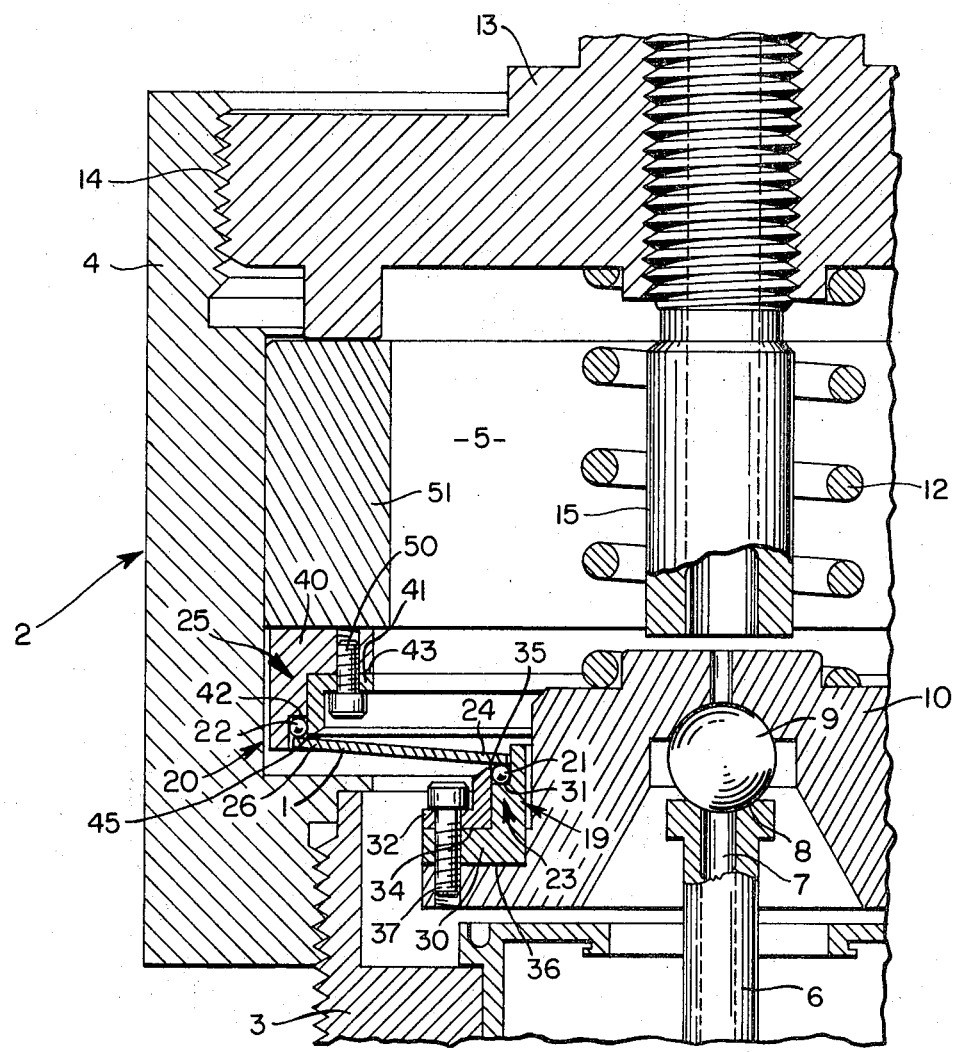
FIG. 1 is a fragmentary longitudinal sectional view through a pressure regulator incorporating a preferred form of Belleville spring supports constructed in accordance with this invention.

Referring now in detail to the drawing and first particularly to FIG. 1, a Belleville spring 1 of conventional type is shown contained for example in a pressure regulator 2 which may consist of a base 3 having a housing 4 threaded thereon providing a chamber 5 for a valve stem 6 having a flow passage 7 therethrough. The upper end of the valve stem 6 is provided with a valve seat 8 for engagement by a ball check valve 9 carried by a spring plate 10 which is urged toward the valve seat 8 by the Belleville spring 1. An auxiliary helical spring 12 may be disposed between the spring plate 10 and an end cap 13 threadedly received in the open end 14 of the housing 4. When there is sufficient pressure in the flow passage 7 to overcome the bias of the Belleville spring 1 and auxiliary helical spring 12, the ball check valve 9 is moved away from the valve seat 8 to permit flow therethrough. An adjustable stop 15 threadedly connected to the end cap 13 limits the outward movement of the ball check valve 9 away from the valve seat 8.

In the usual case, the I.D. and O.D. edges of the Belleville spring are supported by a shoulder or other fixed mounting surface whereby considerable friction and wear are developed as the I.D. and O.D. of the Belleville spring become larger and smaller during flexing, causing the edges thereof to move relative to the fixed mounting surface. However, such undesirable friction and wear may be substantially eliminated with the Belleville spring supports 19 and 20 of the present invention and without affecting the spring rate characteristics of the Belleville spring.

Figure 2:
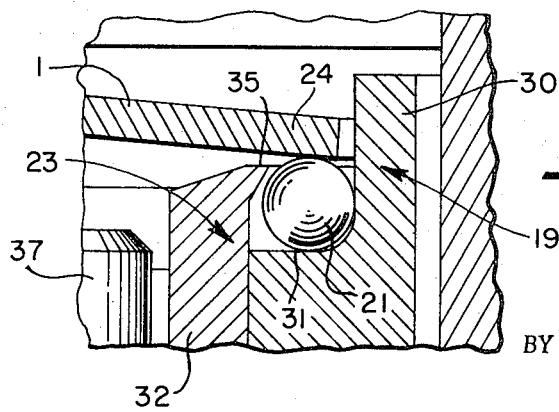
FIG. 2 is an enlarged fragmentary section through one of the supports for the Belleville spring.

As shown, such Belleville spring supports 19 and 20 consist of two sets of closely packed ball bearings 21 and 22, one set 21 being contained in a race 23 adjacent the I.D. edge 24 of the Belleville spring 1 engaging one side thereof, and the other set being contained in another race 25 adjacent the O.D. edge 26 of the Belleville spring engaging the opposite side thereof. The race 23, consists of an annular ball support and spring guide 30 surrounding the spring plate 10 and having an external radial shoulder 31 adjacent one axial end for receipt of the ball bearings 21 which are retained in place by a retainer sleeve 32 in the form of an L-shaped ring supported by a further radial external shoulder 34 on the ball support and spring guide 30. The retainer 32 extends axially outwardly beyond the external shoulder 31 where it is turned radially in at 35 to overly a portion of the periphery of the ball bearings 22 for retaining such ball bearings in place as clearly seen in FIG. 2. With the parts thus assembled, the ball support and spring guide 30 and retainer 32 are secured to an external radial shoulder 36 on the spring plate 10 as by means of cap screws 37, the outer end of the ball support and spring guide 30 extending sufficiently axially beyond the retainer sleeve 32 for receipt of the I.D. edge 24 of the Belleville spring 1 there around thus to provide a guide therefor.

The race 25 is of a similar construction, including a ball support and spring guide 40 and a retainer sleeve 41. However, a radial internal shoulder 42 is provided on the guide 40 for the ball bearings 22, rather than an external shoulder, and a further radial internal shoulder 43 is provided for the retainer 41 which extends axially beyond the shoulder 42 and has a radially out-turned end 45 overlying a portion of the periphery of the ball bearings 22 for retaining them in place with sufficient clearance between the ball bearings 22 and the axial outer end of the ball support and spring guide 40 for receipt of the O.D. edge 26 of the Belleville spring 1. Cap screws 50 or the like may be used to secure the retainer 41 to the guide 40 which is properly positioned in the chamber 5 by disposing a spacer ring 51 between such race 25 and the end cap 13. Preloading of the Belleville spring 1 may be accomplished as by adjusting the location of the end cap 13 within the housing.

In the case of each of the supports 19 and 20, the ball bearings 21 and 22 are desirably relatively small to provide a great many points of support for the Belleville spring, and the radial clearance between the respective ball support and spring guides 30, 40 and retainers 32, 41 for the balls is sufficient to permit limited rolling of the balls in a radial direction on the supporting shoulders of the races as the edges of the Belleville spring move radially in and out during deflection for reduced friction therebetween.

From the above, it can now be seen that the Belleville spring supports of the present invention permit free movement of the edges of the Belleville spring in and out during deflection through rolling contact with antifriction bearings. In actual tests, it has been shown that the friction developed between the Belleville spring and conventional fixed mounting surfaces therefor is about 3 percent of the applied load, whereas with the Belleville spring supports of the present invention, such friction is less than ½percent of the applied load, a reduction in friction of over 600 percent.

I claim:

1. Belleville spring supports comprising two sets of antifriction bearings contained in annular races for engagement with the I.D. and O.D. edges of a Belleville spring on opposite sides thereof, said races having sufficient radial clearance for said bearings to permit said bearings to roll in a radial direction on said races as the I.D. and O.D. edges of the Belleville spring move radially in and out during deflection to reduce friction.

2. The Belleville spring supports of claim 1 wherein said antifriction bearings are relatively small ball bearings closely packed around the entire periphery of said bearing support members to provide a great many points of support for the Belleville spring.

3. In combination, a Belleville spring and supports therefor, said supports comprising two sets of antifriction bearings contained in annular races for engagement with the I.D. and O.D.

edges of said Belleville spring on opposite sides thereof, each of said races comprising an annular bearing support member having a radial shoulder adjacent an axial end for engagement by said bearings, and a retainer sleeve extending axially outwardly beyond said shoulder having an axial outer end radially overlying a portion of the periphery of said bearings for retaining said bearings in place, and means for securing said retainer sleeve to said bearing support member.

4. The combination of claim 3 wherein said races have sufficient radial clearance for said bearings to permit said bearings to roll in a radial direction as the I.D. and O.D. edges of the Belleville spring move axially in and out during deflection.

5. The combination of claim 3 wherein the axial outer ends of said ball support members extend axially beyond the associated retainer sleeves for receipt of the edges of the Belleville spring to provide a guide therefor.

6. The combination of claim 3 further comprising means for preloading said Belleville spring.

7. The combination of claim 3 wherein one of said races is attached to a movable element and the other race is supported by a relatively fixed element.

8. Belleville spring supports comprising two sets of antifriction bearings contained in annular races for engagement with the I.D. and O.D. edges of a Belleville spring on opposite sides thereof, said races having sufficient radial clearance for said bearings to permit said bearings to roll as the I.D. and O.D. edges of the Belleville spring move radially in and out during deflection to reduce friction, each of said races comprising an annular bearing support member having a radial shoulder adjacent one end for engagement by said bearings, and a retainer sleeve extending axially outwardly beyond said shoulder and having an axial outer end radially overlying a portion of the periphery of said bearings for retaining said bearings in place, and means for securing said retainer sleeve to said bearing support member.

9. The Belleville spring supports of claim 8 wherein the axial outer ends of said bearing support members extend axially beyond the associated retainer sleeves for receipt of the edges of the Belleville spring to provide a guide therefor.